(12) United States Patent
Stewart

(10) Patent No.: US 11,538,462 B1
(45) Date of Patent: Dec. 27, 2022

(54) APPARATUSES AND METHODS FOR QUERYING AND TRANSCRIBING VIDEO RESUMES

(71) Applicant: MY JOB MATCHER, INC., Austin, TX (US)

(72) Inventor: Arran Stewart, Austin, TX (US)

(73) Assignee: MY JOB MATCHER, INC., Austin, TX (US)

(*) Notice: Subject to any disclaimer, the term of this patent is extended or adjusted under 35 U.S.C. 154(b) by 0 days.

(21) Appl. No.: 17/695,185

(22) Filed: Mar. 15, 2022

(51) Int. Cl.

| | |
|---|---|
| *G10L 15/12* | (2006.01) |
| *G06F 16/73* | (2019.01) |
| *G10L 15/06* | (2013.01) |
| *G06V 30/19* | (2022.01) |
| *G10L 25/57* | (2013.01) |
| *G10L 15/22* | (2006.01) |
| *G10L 15/16* | (2006.01) |

(52) U.S. Cl.
CPC .............. *G10L 15/12* (2013.01); *G06F 16/73* (2019.01); *G06V 30/19* (2022.01); *G10L 15/063* (2013.01); *G10L 15/22* (2013.01); *G10L 25/57* (2013.01); *G10L 15/16* (2013.01)

(58) Field of Classification Search
CPC ....... G10L 15/12; G10L 15/063; G10L 15/22; G10L 25/57; G10L 15/16; G10L 13/00; G10L 15/00; G10L 17/00; G10L 19/00; G10L 15/26; G10L 15/10; G10L 15/18; G10L 15/32; G10L 2015/085; G10L 21/06; G06F 16/73; G06V 30/19
See application file for complete search history.

(56) References Cited

U.S. PATENT DOCUMENTS

| 9,197,849 B2* | 11/2015 | Bolton .................... H04N 7/147 |
|---|---|---|
| 9,405,807 B2* | 8/2016 | Obernikhin ......... G06F 16/2468 |
| 2004/0186743 A1* | 9/2004 | Cordero, Jr. ....... G06Q 10/1053 |
| | | 705/321 |
| 2005/0060175 A1* | 3/2005 | Farber ................ G06Q 10/1053 |
| | | 705/321 |
| 2007/0038636 A1* | 2/2007 | Zanghi .................. G06Q 10/10 |
| 2008/0262859 A1* | 10/2008 | Ting ....................... G06Q 10/06 |
| | | 705/1.1 |
| 2010/0114791 A1* | 5/2010 | Gold ...................... G06Q 10/10 |
| | | 705/347 |

(Continued)

FOREIGN PATENT DOCUMENTS

CN          104463423 A  *  3/2015  ........... G06Q 10/105

*Primary Examiner* — Matthew H Baker
(74) *Attorney, Agent, or Firm* — Caldwell Intellectual Property Law

(57) ABSTRACT

Aspects relate to apparatuses and methods for generating queries and transcribing video resumes. An exemplary apparatus includes at least a processor and a memory communicatively connected to the processor, the memory containing instructions configuring the processor to receive, from a posting generator, a plurality of posting inputs from a plurality of postings, receive a video resume from a user, generate a plurality of queries as a function of the video resume based on a plurality of posting categories, transcribe, as a function of the plurality of queries, a plurality of user inputs from the video resume, wherein the plurality of user inputs is related to attributes of a user, and classify the plurality of user inputs to the plurality of posting inputs to match the user to the plurality of postings.

18 Claims, 7 Drawing Sheets

(56) References Cited

U.S. PATENT DOCUMENTS

| | | | |
|---|---|---|---|
| 2011/0208665 A1* | 8/2011 | Hirsch | G06Q 10/1053 705/321 |
| 2012/0221477 A1* | 8/2012 | Pande | G06Q 10/1053 705/321 |
| 2013/0226578 A1* | 8/2013 | Bolton | H04N 21/262 704/235 |
| 2014/0317009 A1 | 10/2014 | Bilodeau | |
| 2020/0143329 A1 | 5/2020 | Gamaliel | |
| 2020/0327505 A1 | 10/2020 | Gomes | |
| 2021/0125149 A1 | 4/2021 | Yu | |
| 2021/0350329 A1* | 11/2021 | Sahashi | H04N 7/141 |

* cited by examiner

APPARATUSES AND METHODS FOR QUERYING AND TRANSCRIBING VIDEO RESUMES

FIELD OF THE INVENTION

The present invention generally relates to the field of selective visual display. In particular, the present invention is directed to querying and transcribing video resumes.

BACKGROUND

Video content (including short-form video content) has steadily been rising in popularity for many years. Its advantages as a communication medium are manifest. However, current methods of communication, are not capable of making optimal use of this form of media.

SUMMARY OF THE DISCLOSURE

In an aspect, an apparatus for using machine learning to generate queries and transcribe video resumes is described. The apparatus includes at least a processor and a memory communicatively connected to the processor, the memory containing instructions configuring the processor to receive, from a posting generator, a plurality of posting inputs from a plurality of postings, receive a video resume from a user, generate a plurality of queries as a function of the video resume based on a plurality of posting categories, transcribe, as a function of the plurality of queries, a plurality of user inputs from the video resume, wherein the plurality of user inputs is related to attributes of a user, and classify the plurality of user inputs to the plurality of posting inputs to match the user to the plurality of postings.

In an aspect, a method for using machine learning to generate queries and transcribe video resumes is described. The method includes using a computing device to receive, from a posting generator, a plurality of posting inputs from a plurality of postings, receive a video resume from a user, generate a plurality of queries as a function of the video resume based on a plurality of posting categories, transcribe, as a function of the plurality of queries, a plurality of user inputs from the video resume, wherein the plurality of user inputs is related to attributes of a user, and classify the plurality of user inputs to the plurality of posting inputs to match the user to the plurality of postings.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for using machine learning to generate queries and transcribe video resumes.

Aspects of the present disclosure can be used to automatically query and transcribe resume data contained in a job-seeker's application video. Aspects of the present disclosure can also be used to add appeal to a job application. This is so, at least in part, because information request in sorting an applicant is inherently present within a video resume.

Aspects of the present disclosure allow for practical improvement over current state of art for applicant sorting by allowing for video data to be matched to a plurality of job listings accurately. Exemplary embodiments illustrating aspects of the present disclosure are described below in the context of several specific examples.

Figure 1:
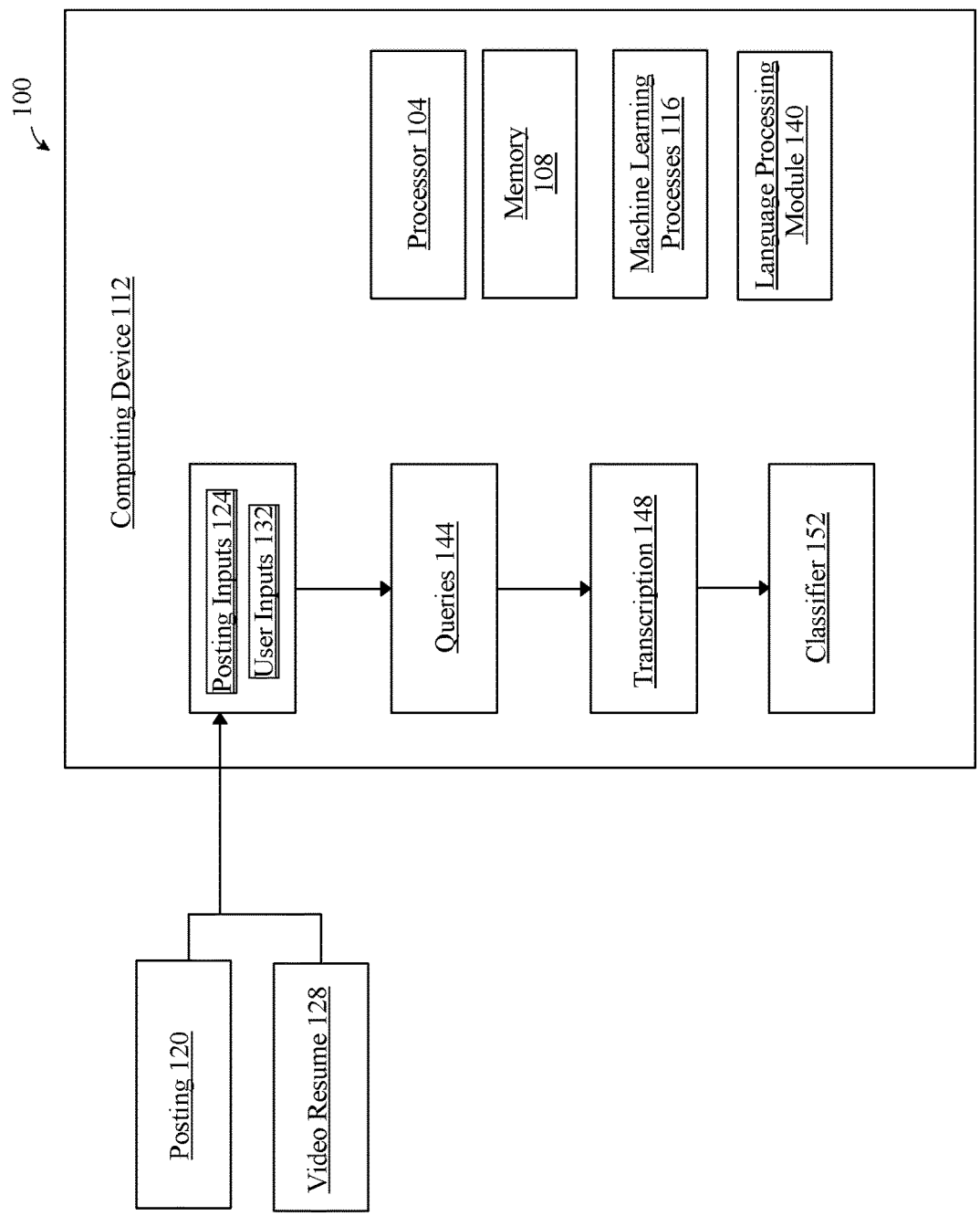
FIG. 1 is a block diagram of an embodiment of an apparatus for querying and transcribing a video resume.

Referring now to FIG. 1, an exemplary embodiment of an apparatus 100 for querying and transcribing video resumes. Apparatus 100 includes a processor 104 and a memory 108 communicatively connected to processor 104, wherein memory 108 contains instructions configuring processor 104 to carry out the process. Processor 104 and memory 108 are contained in a computing device 112. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. A computing device 112 may include any computing device as described in this disclosure, including without limitation a microcontroller, microprocessor, digital signal processor (DSP) and/or system on a chip (SoC) as described in this disclosure. Computing device 112 may include, be included in, and/or communicate with a mobile device such as a mobile telephone or smartphone. Computing device 112 may include a single computing device operating independently, or may include two or more computing device operating in concert, in parallel, sequentially or the like; two or more computing devices may be included together in a single computing device or in two or more computing devices. Computing device 112 may interface or communicate with one or more additional devices as described below in further detail via a network interface device. Network interface device may be utilized for connecting computing device 112 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 112 may include but is not limited to, for example, a computing device or cluster of computing devices in a first location and a second computing device or cluster of computing devices in a second location. Computing device 112 may include one or more computing devices dedicated to data storage, security, distribution of traffic for load balancing, and the like. Computing device 112 may distribute one or more computing tasks as described below across a plurality of computing devices of computing device, which may operate in parallel, in series, redundantly, or in any other manner used for distribution of tasks or memory between computing devices. Computing device 112 may be implemented using a "shared nothing" architecture in which data is cached at the worker, in an embodiment, this may enable scalability of apparatus 100 and/or computing device 112.

With continued reference to FIG. 1, processor 104 and/or computing device 112 may be designed and/or configured by memory 108 to perform any method, method step, or sequence of method steps in any embodiment described in this disclosure, in any order and with any degree of repetition. For instance, processor 104 and/or computing device 112 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 and/or computing device 112 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, processor 104 and/or computing device 112 may perform determinations, classification, and/or analysis steps, methods, processes, or the like as described in this disclosure using machine learning processes 116. A "machine learning process," as used in this disclosure, is a process that automatedly uses a body of data known as "training data" and/or a "training set" (described further below) to generate an algorithm that will be performed by a computing device/module to produce outputs given data provided as inputs; this is in contrast to a non-machine learning software program where the commands to be executed are determined in advance by a user and written in a programming language. Machine-learning process 116 may utilize supervised, unsupervised, lazy-learning processes and/or neural networks, described further below.

With continued reference to FIG. 1, Processor 104 and/or computing device 112 is configured to receive, from a posting generator, a plurality of posting inputs 124 from a plurality of postings 120. As used in this disclosure, a "posting generator" is a hiring entity or employer. For example, the posting generator could be a company, job matching service, and the like. In some embodiments, posting 120 may be a job listing by the posting generator. As used in this disclosure, a "posting input" is information pertaining to the requirements, descriptions, preferences, and the like of a posting generator. In some embodiments, posting 120 may be stored in a database connected to computing device 112 using any network interface described throughout this disclosure. As used in this disclosure, a "posting database" is database containing a plurality of postings 120 from numerous or the same posting generator. For example a posting generator may upload documents containing the hiring requirements for a job to a posting database. The posting database may be implemented, without limitation, as a relational database, a key-value retrieval database such as a NOSQL database, or any other format or structure for use as a database that a person skilled in the art would recognize as suitable upon review of the entirety of this disclosure. The posting database may alternatively or additionally be implemented using a distributed data storage protocol and/or data structure, such as a distributed hash table or the like. The posting database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. Processor 104 and/or computing device 112 may then access those documents in the database through a network to download a document and parse elements of posting 120 data using a language processing module 140. A language processing module 140 may include any hardware and/or software module. The language processing module 140 may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model. In some embodiments, posting 120 may be in the form of video resume 128 as described below With continued reference to FIG. 1, Processor 104 and/or computing device 112 is configured to receive a video resume 128 from a user. In some embodiments, video resume 128 may be divided into temporal sections by the processor for to aid in generating a plurality of queries 144. As used in this disclosure, a "video resume" is an item of digital media in visual and/or audio form to provide a recording promoting a user as described in U.S. Nonprovisional application Ser. No. 17/582,070, filed on Jan. 24, 2022, and entitled "APPARATUSES AND METHODS FOR PARSING AND COMPARING VIDEO RESUME DUPLICATIONS," and U.S. Nonprovisional application Ser. No. 17/487,157, filed on Sep. 28, 2021, and entitled "SYSTEMS AND METHODS FOR PARSING AND CORRELATING SOLICITATION VIDEO CONTENT," each of which is incorporated in its entirety herein by reference. As used in this disclosure a "user" is a person submitting a resume or the like such as a job applicant. In some embodiments, video resume 128 may contain a plurality of user inputs 132. User inputs 132 are attributes related to promoting a user. For example, user inputs 132 may be the competencies, credentials, talents, and the like of a user. Video resume 128 may include any audio and/or visual recording of the user. Video resume 128 may contain descriptions of a user's previous work history, employment credentials, education, achievements and awards, volunteer positions, contact information and the like. Video resume 128 may include a job candidate's answers to one or more questions prompted by an interviewer and/or chat bot. For example, a question may prompt a user to describe a time they had to work on a group project and detail what the most challenging aspect of it was. In some embodiments video resume 128 may be stored in a database connected to Processor 104 and/or computing device 112 using any network interface described throughout this disclosure. In some embodiments, video resume 128 may contain video elements. As used in this disclosure, "video elements" are diverse types of features from video resume 128 such as image features, frame features, sound features, graphical features, and the like. In some embodiments, video resume 128 may contain an image component. As used in this disclosure, an "image component" is a visual representation of information, such as a plurality of temporally sequential frames and/or pictures, related to video resume 128. For example, image component may include animations, still imagery, recorded video, and the like.

Still referring to FIG. 1, as used in this disclosure, a "temporal section" is a clip of a video file that is marked by a start and end time in relation to the whole video file. A plurality of temporal sections may be identified using a neural network, discussed in further detail in FIG. 3. A neural network may be trained to output temporal sections of video resume 128. A temporal section may be user defined such that a user may input into a computing device (such as a laptop, smartphone, desktop, iPad, tablet, and the like), temporal sections of a video resume. A temporal section may be defined in any other way is contemplated within the scope of this disclosure. Temporal sections may be based on an interview question prompted by an interviewer or a chat box such that each section has a clip of the user answering a question. In other embodiments, temporal sections may be based on posting categories, as described further below. Neural network may be trained by inputting training examples of videos partitioned by hand, wherein the start of the temporal section is the question, and the end of the temporal section is the end of the user's answer to the question. Neural network may be trained to recognize the start of a temporal section by the presentation of a title card of the question and the end of a temporal section as the start of the next title card. As used herein, a "title card" is an audiovisual representation of a question. In an embodiment, a title card may have the question written on a colored background before showing a user answering the question. In some embodiments, a question may be displayed in the lower third of the video resume. In these embodiments, the question may be displayed before the user answers the question or during and/or throughout the user's answer to the question. For the purposes of this disclosure "the lower third" of a video is a special section of the video over which text may be overlayed. In some embodiments, this may not necessarily be the entire lower one third portion of the video. In some embodiments, the overlay may take up less than the lower one third portion of the video. In some embodiments, the overlay may take up more than the lower one third portion of the video; as a non-limiting example, the overlay may take up the lower one quarter portion of the video. In some embodiments, the overlay may be placed in the title-safe portion of the video. In other embodiments, the title card may have the posting category written on a colored background before showing a user answering. For example, a posting category title card may be labeled with "experience", "education", "personality", and the like.

Still referring to FIG. 1, in some embodiments, processor 104 and/or computing device 112 may be configured to compress video resume 128 to optimize transmission. Digital video may be compressed to optimize speed and/or cost of transmission of video. Videos may be compressed according to a video compression coding format (i.e., codec). Exemplary video compression codecs include H.26x codecs, MPEG formats, SVT-AV1, and the like. In some cases, compression of a digital video may be lossy, in which some information may be lost during compression. Alternatively, or additionally, in some cases, compression of a digital video may be substantially lossless, where substantially no information is lost during compression. Further apparatuses and methods of video compression are described in U.S. Nonprovisional application Ser. No. 17/582,070, filed on Jan. 24, 2022, and entitled "APPARATUSES AND METHODS FOR PARSING AND COMPARING VIDEO RESUME DUPLICATIONS," which is incorporated in its entirety herein by reference.

Still referring to FIG. 1, in some cases, video resume 128 may include non-verbal content. As used in this disclosure, "non-verbal content" is all communication that is not characterized as verbal content. As used in this disclosure, "verbal content" is comprehensible language-based communication. For example, verbal content may include "visual verbal content" which is literal and/or written verbal content. Non-verbal content includes all forms of communication which are not conveyed with use of language. Exemplary non-verbal content may include change in intonation and/or stress in a speaker's voice, expression of emotion, and the like. For example, in some cases, non-verbal content may include visual non-verbal content. As used in this disclosure, "visual non-verbal content" is non-verbal content that is visually represented. In some cases, visual non-verbal content may be included within video resume 128 by way of image component. In some cases, a non-verbal classifier may classify non-verbal content present in one or more image component to one or more of postings 120. Non-verbal classifier may include a number of classifiers, discussed further below, for example each being tasked with classifying a particular attribute or form of non-verbal content.

With continued reference to FIG. 1, in some embodiments, an image component may include or otherwise represent verbal content. For instance, written or visual verbal content may be included within image component. Visual verbal content may include images of written text represented by image component. For example, visual verbal content may include, without limitation, digitally generated graphics, images of written text (e.g., typewritten, and the like), signage, and the like.

Still referring to FIG. 1, in some embodiments, an image component may include or otherwise represent audible verbal content related to at least an attribute of a user. As used in this disclosure, "audible verbal content" is oral (e.g., spoken) verbal content. In some cases, audible verbal content may be included within video resume 128 by way of an audio component. As used in this disclosure, an "audio component" is a representation of audio, for example a sound, a speech, and the like. In some cases, verbal content may be related to at least an attribute of user. Additionally, or alternatively, visual verbal content and audible verbal content may be used as inputs to classifiers as described throughout this disclosure.

With continued reference to FIG. 1, processor 104 and/or computing device 112 is configured to generate a plurality of queries 144 as a function of the received video resume 128 based on a plurality of posting categories. As used in this disclosure, a "posting category" is a specific grouping of related information. For example, the posting category may be any user inputs related to the field of computer science as a keyword of posting 120. Processor 104 and/or computing device 112 may use a text retrieval process as a function of at least a keyword to generate queries 144. As used in this disclosure, a "keyword" is an element of word or syntax used to identify and/or match elements to each other. In some cases, Processor 104 and/or computing device 112 may transcribe much or even substantially all verbal content in video resume 128. A query may include a request to identify one or more segments and user responses contained within video resume 128. In an embodiment, a query may be generated based on qualities identified and desired within posting 120. For example, a job listing for a pediatric trauma surgeon may be utilized by processor 104 and/or computing device 112 to create a query to identify any mention of a "pediatric trauma surgeon" and/or related credentials within a job seeker's video resume 128. This may include the use of machine learning, to identify and learn related words and/or phrases that may be associated with particular credentials, skills, and traits. For example, a query for "lawyer" may be learned by the processor to also generate a query for words related to "lawyer" such as attorney, solicitor, counselor, advocate, counsel, attorney-at-law and the like.

With continued reference to FIG. 1, in some embodiments, text search may include techniques for searching a single computer-stored document or a collection of documents, for example in a database. Text search may include full-text search. Full-text search may be distinguished from searches based on metadata or on field-based searching (e.g., fields such as titles, abstracts, selected sections, or bibliographical references). In an exemplary full-text search, processor 104 and/or computing device 112 may examine all words in every stored document as it tries to match search criteria (for example, keywords). Alternatively, a text search may be limited to fields, such as with field-based searching.

Still referring to FIG. 1, in some embodiments, text searching may include querying a database of video resumes 128 in which multiple video resumes 128 of users are stored. As used in this disclosure, "video resume database" is a data structure configured to store data associated with a plurality of video resumes 128. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. In some cases, querying of at least a video element may include any number of querying tools, including without limitation keywords (as described above), field-restricted search, Boolean queries 144, phrase search, concept search, concordance search, proximity search, regular expression, fuzzy search, wildcard search, and the like. In some cases, keywords may be used to perform a query. In some cases, a document (or trained indexers) may supply a list of words that describe subject of the document, including without limitation synonyms of words that describe the subject. In some cases, keywords may improve recall, for instance if the keyword list includes a keyword that is not in text of a document. In some cases, querying tools may include field-restricted search. A field-restricted search may allow a queries 144 scope to be limited to within a particular field within a stored data record, such as "Title" or "Author." In some cases, a query tool may include Boolean queries 144. Searches that use Boolean operators (for example, "encyclopedia" AND "online" NOT "Encarta") can dramatically increase precision of a search. In some cases, an AND operator may say, in effect, "Do not retrieve any document unless it contains both of these terms." In some cases, a NOT operator may say, in effect, "Do not retrieve any document that contains this word." In some cases, a retrieval list retrieving too few documents, may prompt and OR operator to be used in place of an AND operator to increase recall; consider, for example, "encyclopedia" AND "online" OR "Internet" NOT "Encarta". This search will retrieve documents about online encyclopedias that use the term "Internet" instead of "online." In some cases, search precision and recall are interdependent and negatively correlated in text searching. In some cases, a query tool may include phrase search. In some cases, a phrase search may match only those documents that contain a specified phrase. In some cases, a query tool may include a concept search. In some cases, a concept search may be based on multi-word concepts, for example compound term processing. In some cases, a query tool may include a concordance search. In some cases, a concordance search may produce an alphabetical list of all principal words that occur in a text and may include their immediate context. In some cases, a query tool may include a proximity search. In some cases, a proximity search matches only those documents that contain two or more words that are separated by a specified number of words, are in the same sentence, or an in the same paragraph. A query tool may include a regular expression. In some cases, a regular expression may employ a complex but powerful querying syntax that can be used to specify retrieval conditions with precision, for instance database syntax. A query tool may include a fuzzy search. In some cases, a fuzzy search may search for a document that matches given terms while allowing for some variation around them. In some cases, a query tool may include a wildcard search. In some cases, a wildcard search may substitute one or more characters in a search query for a wildcard character such as an asterisk. For example, using a wildcard, such as an asterisk, in a search query "s*n" will search for terms inclusive of "sin," "son," "sun," and the like.

With continued reference to FIG. 1, processor 104 and/or computing device 112 is configured to transcribe, as a function of a plurality of queries 144, a plurality of user inputs 132 from video resume 128. The plurality of user inputs 132 are related to the attributes of the user. The process may include using word recognition software to create a transcript 148 of video resume 128, such as, automatic speech recognition, natural language processing, optical character recognition, and the like. As used in this disclosure, a "transcript 148" is a text version of information originally presented in a different medium, such as audio, images, and the like. For example, if a query is for a "truck driver" and video resume 128 contains the phrase "commercial driver's license (CDL)" at three different points throughout video resume 128, then processor 104 and/or computing device 112 may extract those segments of the video that mention CD and transcribe them. This may include the use of machine learning, to identify and learn related words and/or phrases that may be associated with credentials, skills, and traits. In some embodiments, transcribing the plurality of user inputs 132 includes using automatic speech recognition. In some embodiments, transcribing the plurality of user inputs 132 includes using optical character recognition. Both of which are described further below.

In some cases, processor 104 and/or computing device 112 may include audiovisual speech recognition (AVSR) processes to recognize verbal content in video resumes 128. For example, Processor 104 and/or computing device 112 may use image content to aid in recognition of audible verbal content such as viewing user move their lips to speak on video to process the audio content of video resume 128. AVSR may use image component to aid the overall translation of the audio verbal content of video resumes 128. In some embodiments, AVSR may include techniques employing image processing capabilities in lip reading to aid speech recognition processes. In some cases, AVSR may be used to decode (i.e., recognize) indeterministic phonemes or help in forming a preponderance among probabilistic candidates. In some cases, AVSR may include an audio-based automatic speech recognition process and an image-based automatic speech recognition process. AVSR may combine results from both processes with feature fusion. Audio-based speech recognition process may analysis audio according to any method described herein, for instance using a Mel frequency cepstrum coefficients (MFCCs) and/or log-Mel spectrogram derived from raw audio samples. Image-based speech recognition may perform feature recognition to yield an image vector. In some cases, feature recognition may include any feature recognition process described in this disclosure, for example a variant of a convolutional neural network. In some cases, AVSR employs both an audio datum and an image datum to recognize verbal content. For instance, audio vector and image vector may each be concatenated and used to predict speech made by a user, who is 'on camera.'

In some cases, Processor 104 and/or computing device 112 may be configured to recognize at least a keyword as a function of visual verbal content. In some cases, recognizing at least keyword may include optical character recognition. Optical character recognition or optical character reader (OCR) may include automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to Image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some cases, OCR may employ a two-pass approach to character recognition. A first pass may try to recognize a character. Each character that is satisfactory is passed to an adaptive classifier as training data. The adaptive classifier then gets a chance to recognize characters more accurately as it further analyzes image components. Since the adaptive classifier may have learned something useful a little too late to recognize characters on the first pass, a second pass is run over the image components. Second pass may include adaptive recognition and use characters recognized with high confidence on the first pass to recognize better remaining characters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, Still referring to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, processor 104 and/or computing device 112 is configured to classify a plurality of user inputs 132 to a plurality of posting inputs 124 to match a user to a plurality of postings 120. Classifying the plurality of user inputs 132 may include a classification algorithm to output matches between the user and the plurality of postings 120. A "classifier," as used in this disclosure is a machine-learning model, such as a mathematical model, neural net, or program generated by a machine learning algorithm known as a "classification algorithm," as described in further detail below, that sorts of inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Processor 104 and/or computing device 112 may generate classifier 152 using a classification algorithm, defined as a process whereby processor 104 and/or computing device 112 derives classifier 152 from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifier 152s, decision trees, boosted trees, random forest classifiers, learning vector quantization, and/or neural network-based classifier 152s. In some embodiments, classifier 152 may take the data collected from posting inputs 124 and user inputs 132 as algorithm inputs, wherein the training data includes a video/posting database, queried video resumes 128, transcript 148ion of the plurality of video resumes 128, and output data from a language processing module 140, to match a user to a plurality of postings 120. For example video resume 128 related to nursing, once queried, and may be put through classifier 152 to be matched to postings 120 related to medical/nursing job listings.

Still referring to FIG. 1, Processor 104 and/or computing device 112 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Processor 104 and/or computing device 112 may then calculate a likelihood table by calculating probabilities of different data entries and classification labels. Processor 104 and/or computing device 112 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, Processor 104 and/or computing device 112 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, language processing module 140 may operate to produce a language processing model. Language processing model may include a program automatically generated by computing device and/or language processing module 140 to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to 1, language processing module 140 and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated.

In an alternative or additional approach, sequential tokens may be modeled as chains, serving as the observations in a Hidden Markov Model HIVIMs as used herein are statistical models with inference algorithms that that may be applied to the models. In such models, a hidden state to be estimated may include an association between an extracted words, phrases, and/or other semantic units. There may be a finite number of categories to which an extracted word may pertain; an MINI inference algorithm, such as the forward-backward algorithm or the Viterbi algorithm, may be used to estimate the most likely discrete state given a word or sequence of words. Language processing module 140 may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating the language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module 140 may use a corpus of documents to generate associations between language elements in a language processing module 140, and diagnostic engine may then use such associations to analyze words extracted from one or more documents and determine that the one or more documents indicate significance of a category. In an embodiment, language module and/or Processor 104 and/or computing device 112 may perform this analysis using a selected set of significant documents, such as documents identified by one or more experts as representing good information; experts may identify or enter such documents via graphical user interface or may communicate identities of significant documents according to any other suitable method of electronic communication, or by providing such identity to other persons who may enter such identifications into Processor 104 and/or computing device 112. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

Still referring to FIG. 1, processor 104 and/or computing device 112 may be configured to generate a similarity score based on the matches between the user and the plurality of postings of classifier 152. A "similarity score," as used in this disclosure is a measure of closeness of association between video resumes 128 and the plurality of postings 120. The similarity score may be represented as a numeric value, or a linguistics score as described further below. In some embodiments, the similarity score may be calculated using a fuzzy inference system as described further below. In some embodiments, the similarity score may be calculated using dynamic time warping based on a similarity matrix. Dynamic time warping may include algorithms for measuring similarity between two sequences, which may vary in time or speed. For instance, similarities in walking patterns may be detected between posting 120 (in video format, e.g. target video resume 128) and video resume 128, even if in one video the person was walking slowly and if in another he or she were walking more quickly, or even if there were accelerations and deceleration during one observation. DTW has been applied to video, audio, and graphics—indeed, any data that can be turned into a linear representation can be analyzed with DTW. In some cases, DTW may allow Processor 104 and/or computing device 112 to find an optimal match between two given sequences (e.g., time series) with certain restrictions. That is, in some cases, sequences can be "warped" non-linearly to match each other. In some embodiments, the matches of the classifier 152 may be ranked by processor 104 and/or computing device 112 based on the similarity score using linear regression techniques. For example, processor 104 and/or computing device 112 may display to a user, in descending order of similarity, the matches between video resume 128 and the plurality of postings 120. Processor 104 and/or computing device 112 may be designed and configured to create a machine-learning model using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Figure 2:
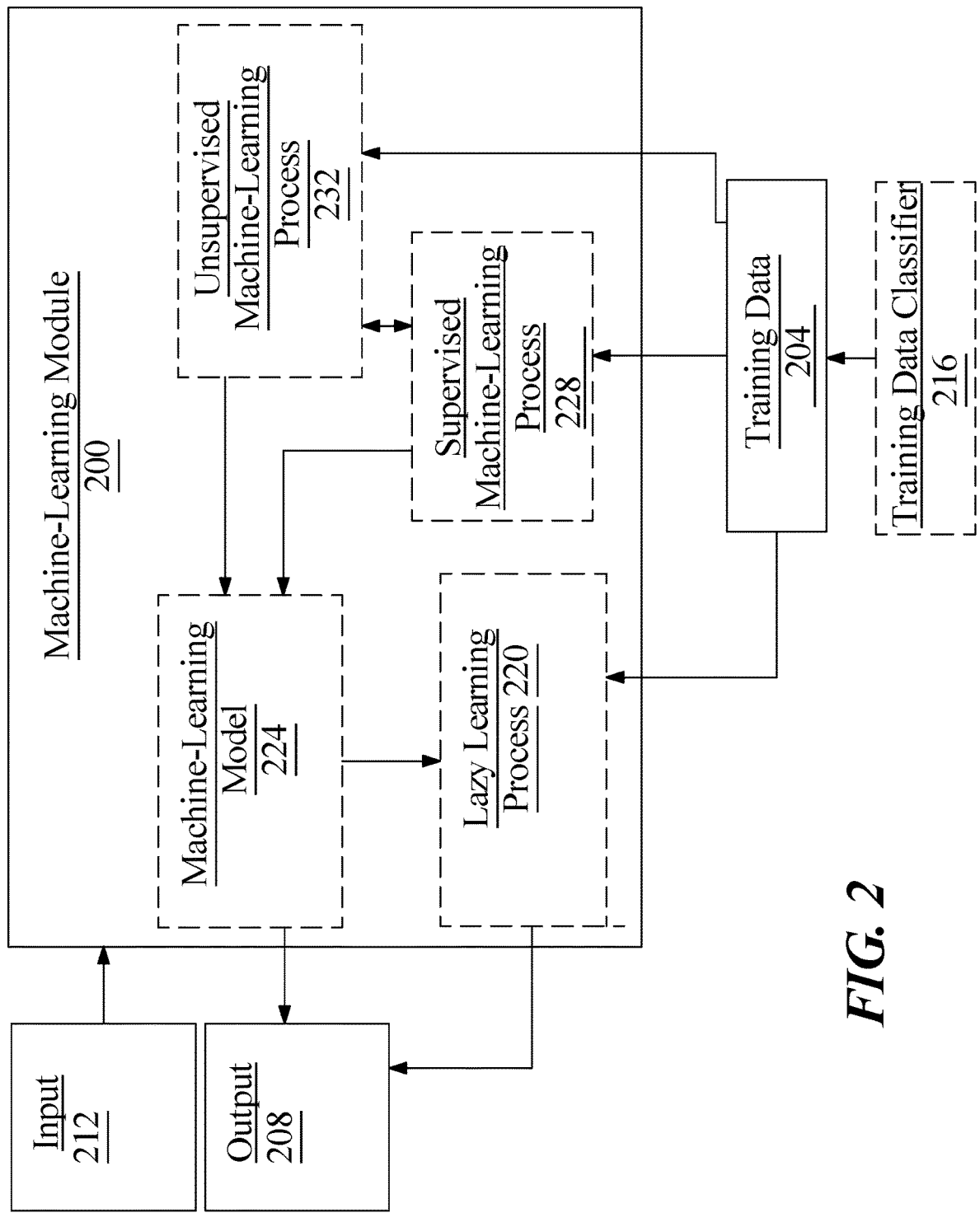
FIG. 2 is a block diagram of exemplary embodiment of a machine learning module.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs as described above in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 3:
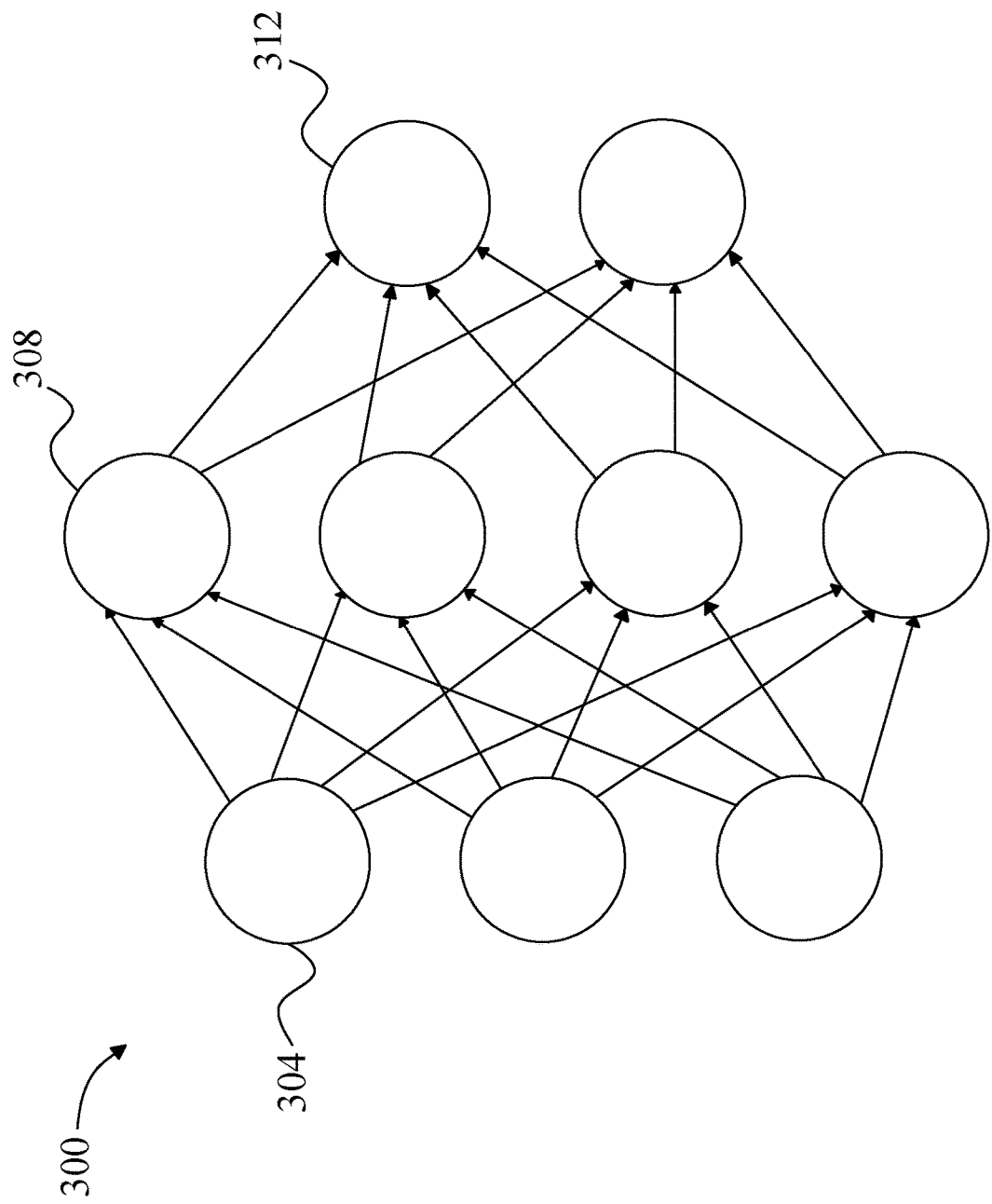
FIG. 3 illustrates an exemplary neural network.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 4:
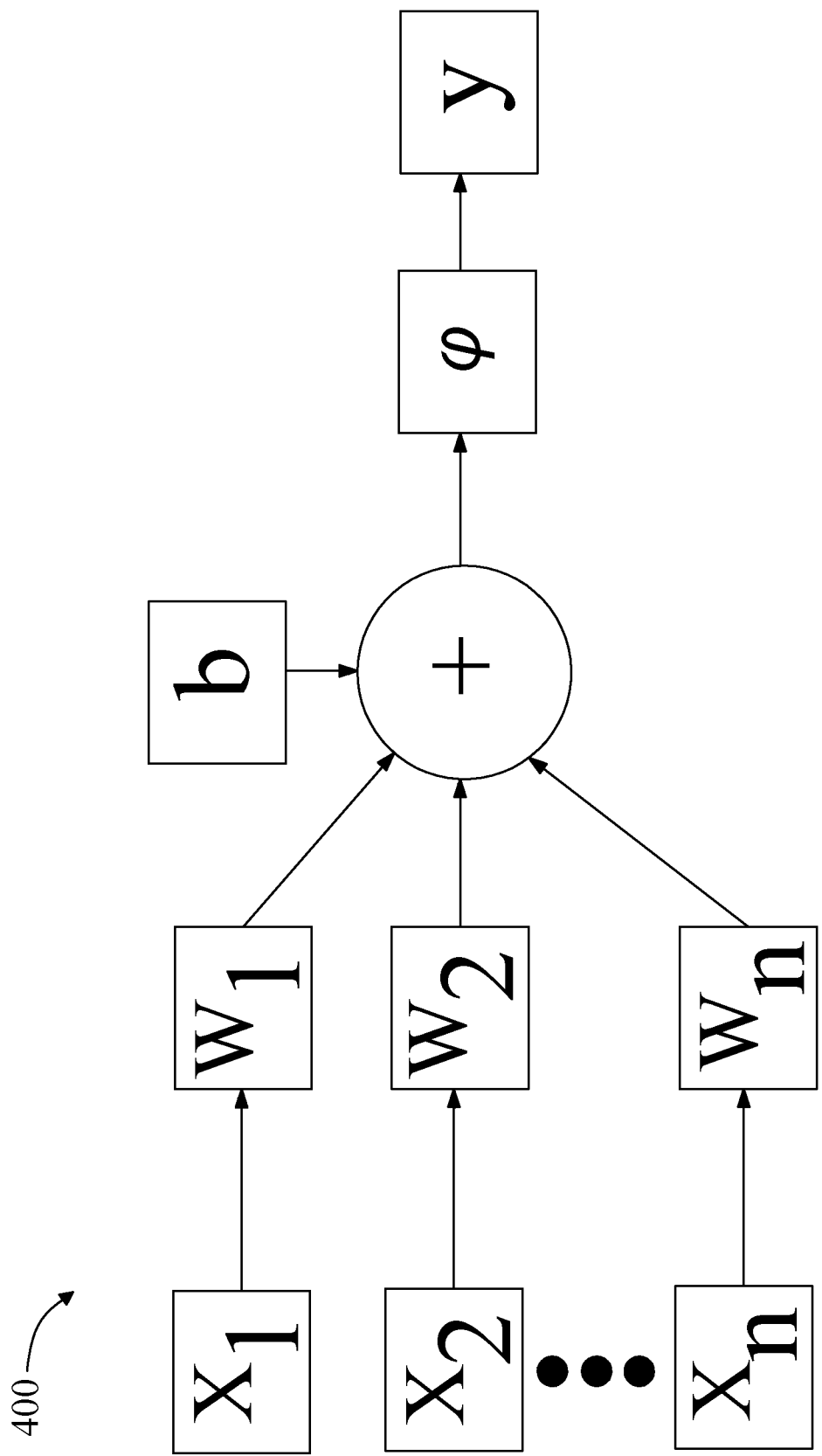
FIG. 4 is a block diagram of an exemplary node of a neural network.

Referring now to FIG. 4, an exemplary embodiment of a node of a neural network is illustrated. A node may include, without limitation a plurality of inputs xi that may receive numerical values from inputs to a neural network containing the node and/or from other nodes. Node may perform a weighted sum of inputs using weights wi that are multiplied by respective inputs xi. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight wi applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights wi may be determined by training a neural network using training data, which may be performed using any suitable process as described above.

Figure 5:
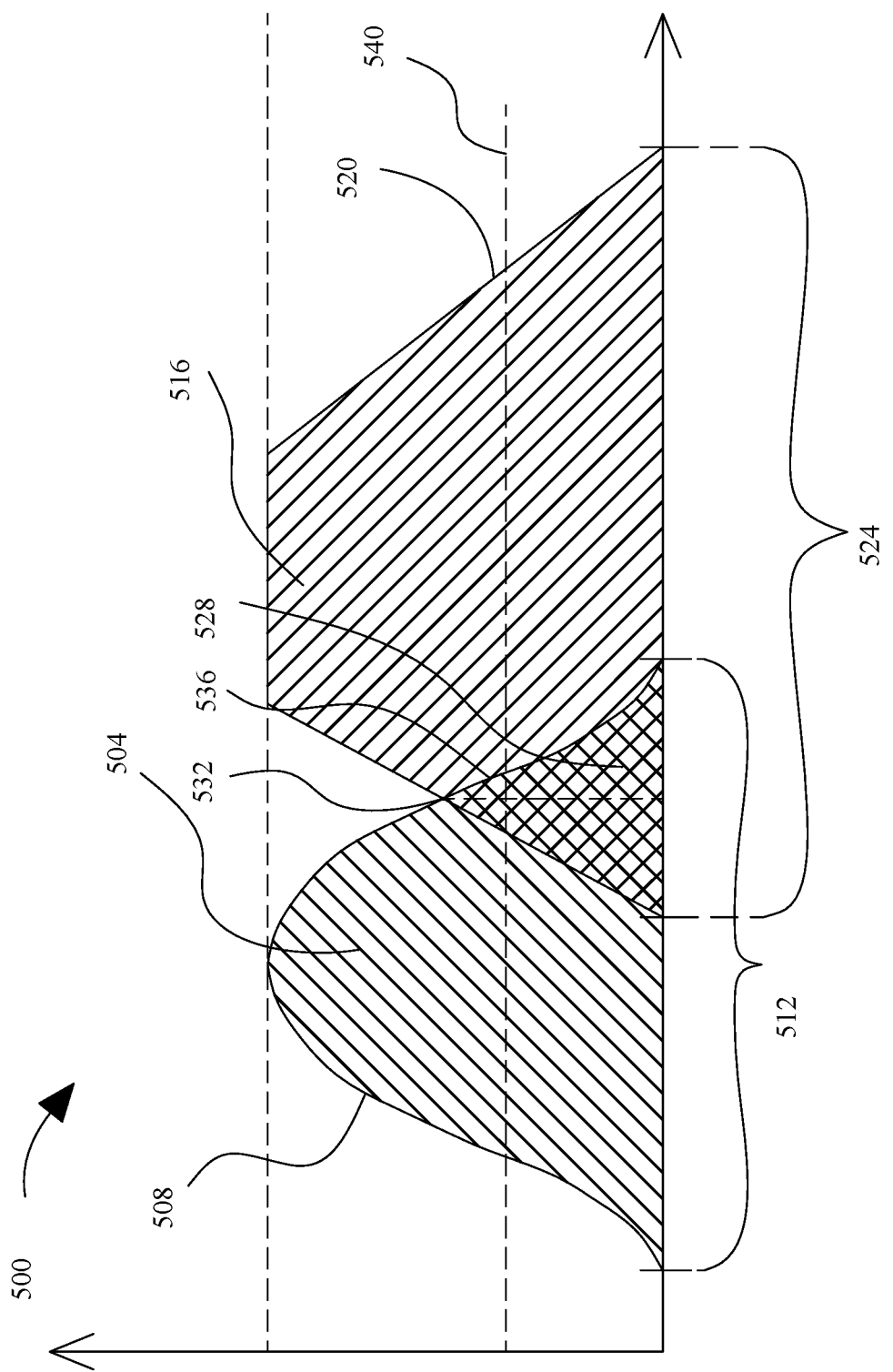
FIG. 5 is a graph illustrating an exemplary relationship between fuzzy sets.

Referring now to FIG. 5, an exemplary embodiment of fuzzy set comparison 500 is illustrated. A first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 5, first fuzzy set 504 may represent any value or combination of values as described above, including output from one or more machine-learning models video queries user inputs, postings inputs 124, and the like. A second fuzzy set 516, which may represent any value which may be represented by first fuzzy set 504, may be defined by a second membership function 520 on a second range 524; second range 524 may be identical and/or overlap with first range 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 532 representing a probability, as defined on probability interval, of a match between first fuzzy set 504 and second fuzzy set 516. Alternatively or additionally, a single value of first and/or second fuzzy set may be located at a locus 536 on first range 512 and/or second range 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models and/or video resume and a predetermined class, such as without limitation &&&, for combination to occur as described above. Alternatively or additionally, each threshold may be tuned by a machine-learning and/or statistical process, for instance and without limitation as described in further detail below.

Further referring to FIG. 5, in an embodiment, a degree of match between fuzzy sets may be used to classify a video resume with a posting. For instance, if a video resume has a fuzzy set matching a posting fuzzy set by having a degree of overlap exceeding a threshold, Processor 104 and/or computing device 112 may classify the video resume as belonging to a posting. Where multiple fuzzy matches are performed, degrees of match for each respective fuzzy set may be computed and aggregated through, for instance, addition, averaging, or the like, to determine an overall degree of match.

Still referring to FIG. 5, in an embodiment, video resume may be compared to multiple posting fuzzy sets. For instance, video resume may be represented by a fuzzy set that is compared to each of the multiple posting fuzzy sets; and a degree of overlap exceeding a threshold between the video resume fuzzy set and any of the multiple a posting fuzzy sets may cause Processor 104 and/or computing device 112 to classify the video resume as belonging to a posting. For instance, in one embodiment there may be two posting fuzzy sets, representing respectively a first posting and a second posting. First posting may have a first fuzzy set; Second a posting may have a second fuzzy set; and video resume may have a video resume fuzzy set. Processor 104 and/or computing device 112, for example, may compare a video resume fuzzy set with each of the first posting fuzzy set and second posting fuzzy set, as described above, and classify video resume to either, both, or neither of the first posting or the second posting. Machine-learning methods as described throughout may, in a non-limiting example, generate coefficients used in fuzzy set equations as described above, such as without limitation x, c, and $\sigma$ of a Gaussian set as described above, as outputs of machine-learning methods. Likewise, video resume may be used indirectly to determine a fuzzy set, as video resume fuzzy set may be derived from outputs of one or more machine-learning models that take the video resume directly or indirectly as inputs.

Still referring to FIG. 5, a computing device may use a logic comparison program, such as, but not limited to, a fuzzy logic model to determine a similarity score as defined above A similarity score may include, but is not limited to, insufficient, average, superior, and the like; each such similarity score may be represented as a value for a linguistic variable representing similarity, or in other words a fuzzy set as described above that corresponds to a degree of similarity as calculated using any statistical, machine-learning, or other method that may occur to a person skilled in the art upon reviewing the entirety of this disclosure. In other words, a given element of video resume may have a first non-zero value for membership in a first linguistic variable value such as "average" and a second non-zero value for membership in a second linguistic variable value such as "poor" In some embodiments, determining a similarity score may include using a linear regression model. A linear regression model may include a machine learning model. A linear regression model may be configured to map data of video resume, such as input elements of video resume, to one or more similarity scores. A linear regression model may be trained using any training data sets described throughout this disclosure, such as the video query results, language processing model output and classifier output. In some embodiments, determining a similarity score of video resume may include using a similarity score classification model. A similarity score classification model may be configured to input collected data and cluster data to a centroid based on, but not limited to, frequency of appearance, linguistic indicators of similarity, and the like. Centroids may include scores assigned to them such that user inputs in video resume may each be assigned a score. In some embodiments, a similarity score classification model may include a K-means clustering model. In some embodiments, a similarity score classification model may include a particle swarm optimization model. In some embodiments, determining a similarity score of video resume may include using a fuzzy inference engine. A fuzzy inference engine may be configured to map one or more video resume data elements using fuzzy logic. In some embodiments, a plurality of entity assessment devices may be arranged by a logic comparison program into a similarity score arrangements. An "a similarity score arrangement" as used in this disclosure is any grouping of objects and/or data based on output score. Membership function coefficients and/or constants as described above may be tuned according to classification and/or clustering algorithms. For instance, and without limitation, a clustering algorithm may determine a Gaussian or other distribution of questions about a centroid corresponding to a given similarity level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 5, an inference engine may be implemented according to input and/or output membership functions and/or linguistic variables. For instance, a first linguistic variable may represent a first measurable value pertaining to user input of video resume, such as a degree of experience of an element of video resume, while a second membership function may indicate a degree of compatibility of a posting thereof, or another measurable value pertaining to video resume. Continuing the example, an output linguistic variable may represent, without limitation, a score value. An inference engine may combine rules, such as: "if the experience level is 'average' and the compatibility level is 'high', the similarity score is 'high'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥" such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Figure 6:
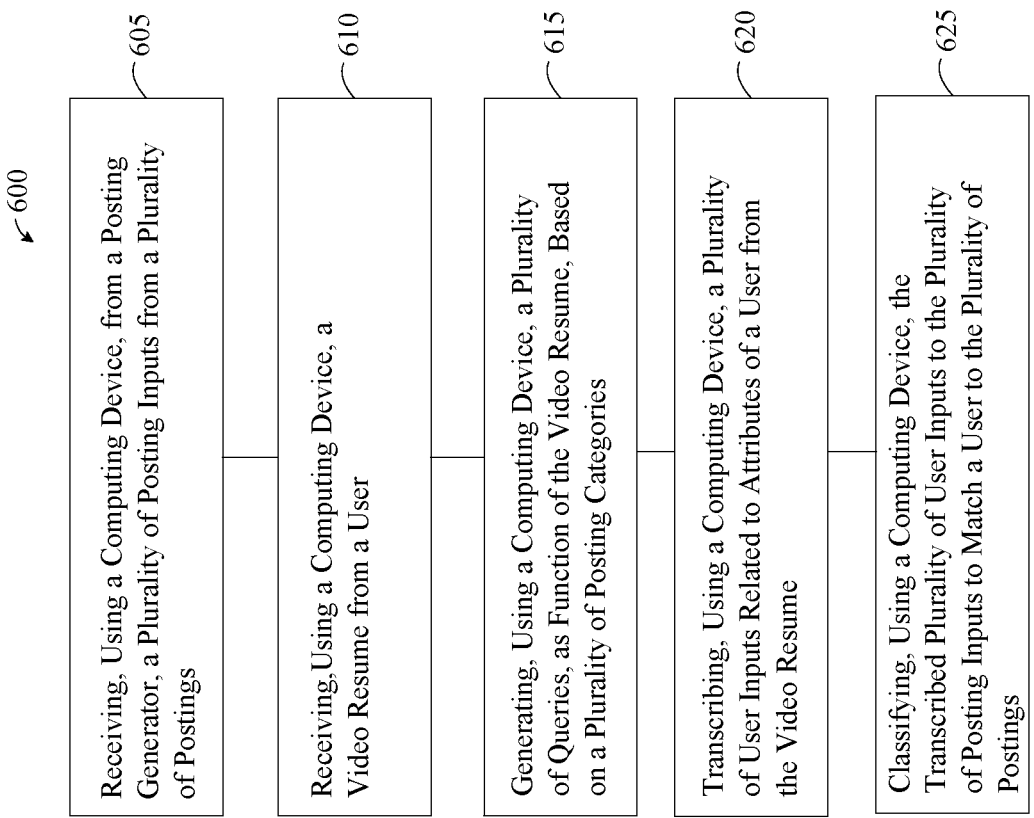
FIG. 6 is a flow diagram of an exemplary method for querying and transcribing a video resume.

Referring now to FIG. 6, is a flow diagram of an exemplary method 600 for using machine learning to generate queries and transcribe video resumes. Method 600 includes using a computing device, as any described throughout this disclosure, for example and with reference to FIG. 1. At step 605, method 600 include a computing device configured to receive, from a posting generator, a plurality of postings inputs form a plurality of postings. As defined in FIG. 1, the posting generator could be a company, job matching service, and the like. In some embodiments, a posting may be a job listing by the posting generator. With reference to FIG. 1, a posting may be stored in a posting database connected to computing device. In some embodiments, a posting may be stored in a database connected to the computing device using any network interface described throughout this disclosure, for example and with reference to FIG. 1. In some embodiments, the computing device may process posting input from a posting using a language processing module, for example and with reference FIG. 1. In some embodiments, t posting may be in video format, for example and with reference to FIG. 1.

Still referring to FIG. 6, at step 610, method 600 include using a computing device configured to receive a video resume from a user. In some embodiments, the video resume may be divided into temporal sections by the computing device to aid in generating a plurality of queries. The video resume may be any video resume described through this disclosure, for example and with reference to FIG. 1. User inputs may be the competencies, credentials, talents, and the like of a user. The video resume may include any audio and/or visual recording of the user. The video resume may contain descriptions of a user's previous work history, employment credentials, education, achievements and awards, volunteer positions, contact information and the like. In some embodiments, video resume may contain video elements which are diverse types of features from a video resume such as image features, frame features, sound features, graphical features, and the like. In some embodiments, video resume may contain an image component. The video resume may additionally contain any other data or elements described throughout this disclosure, for example and with reference to FIG. 1.

Still referring to FIG. 6, in some embodiments, the computing device may be configured to compress video resume to optimize transmission. Digital video may be compressed to optimize speed and/or cost of transmission of video. Videos may be compressed according to a video compression coding format (i.e., codec). Exemplary video compression codecs include H.26x codecs, MPEG formats, SVT-AV1, and the like. In some cases, compression of a digital video may be lossy, in which some information may be lost during compression. Alternatively, or additionally, in some cases, compression of a digital video may be substantially lossless, where substantially no information is lost during compression. The video resume may be consistent with any video resume discussed throughout this disclosure, for example and with reference to FIG. 1.

Still referring to FIG. 6, at step 615, method 600 includes using a computing device configured to generate a plurality of queries as a function of the video resume based on a plurality of posting categories, for example and with reference to FIG. 1. The computing device may use a text retrieval process as a function of at least a keyword to generate queries. In some cases, the computing device may transcribe much or even substantially all verbal content in a video resume. A query may include a request to identify one or more segments and user responses contained within the video resume. In an embodiment, a query may be generated based on qualities identified and desired within a job posting. This may include the use of machine learning, to identify and learn related words and/or phrases that may be associated with particular credentials, skills, and traits, for example and with reference to FIGS. 1 and 2. Text searching may include any techniques described through this disclosure, for example and with reference to FIG. 1. For example, text searching may include querying a database of video resumes in which multiple video resumes of users are stored. In some cases association of video resume with at least a posting may include one or more of machine-learning process and/or classifiers. Machine-learning process may include any machine-learning process described in this disclosure. Classifier may include any classifier described in this disclosure. In some cases, the computing device may associate video resume with at least keyword as a function of at least feature as described in FIG. 1.

Still referring to FIG. 6, at step 620, method 600 includes using a computing device configured to transcribe, as a function of a plurality of queries, a plurality of user inputs from a video resume, for example and with reference to FIG. 1. The plurality of user inputs is related to the attributes if the user. The process may include using word recognition software to create a transcript of a video resume, such as, automatic speech recognition, natural language processing, optical character recognition, and the like, for example and with reference to FIG. 1. This may include the use of machine learning, to identify and learn related words and/or phrases that may be associated with credentials, skills, and traits. In some embodiments, transcribing the plurality of user inputs includes using automatic speech recognition and/or optical character recognition, as disclosed in FIG. 1

Still referring to FIG. 6, at step 625, method 600 includes using a computing device configured to classify the plurality of user inputs to the plurality of postings inputs 124 to match a user to the plurality of postings 120. Additionally, in some embodiments, the computing device may be configured to rank the matches between the user and the plurality of postings using a classification algorithm. Classifying the plurality of user inputs may include a classification algorithm to output matches between the user and the plurality of postings 120, for example and with reference to FIG. 1. Classifier may be generated using any algorithm described through this disclosure. In some embodiments, classifier may take the data collected from postings inputs 124 and user inputs as algorithm inputs, wherein the training data includes a video/posting database, queried video resumes, transcription of the plurality of video resumes, and output data from a language processing module, to match a user to a plurality of postings 120. In some embodiments, the computing device may be configured to generate a similarity score based on the matches between the user and the plurality of postings of the classification algorithm, as described in FIG. 1. The similarity score may be represented as a numeric value, or a linguistics score as described further below. In some embodiments, the similarity scored is calculated using a fuzzy inference system as describe in FIG. 5. In some embodiments, the similarity score may be calculated using dynamic time warping based on a similarity matrix as described in FIG. 1. In some embodiments, the matches between the user and the plurality of postings of the classification algorithm may be ranked based on the similarity score using linear regression techniques. For example, the computing device may display to a user, in descending order of similarity, the matches between the video resume and the plurality of postings.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
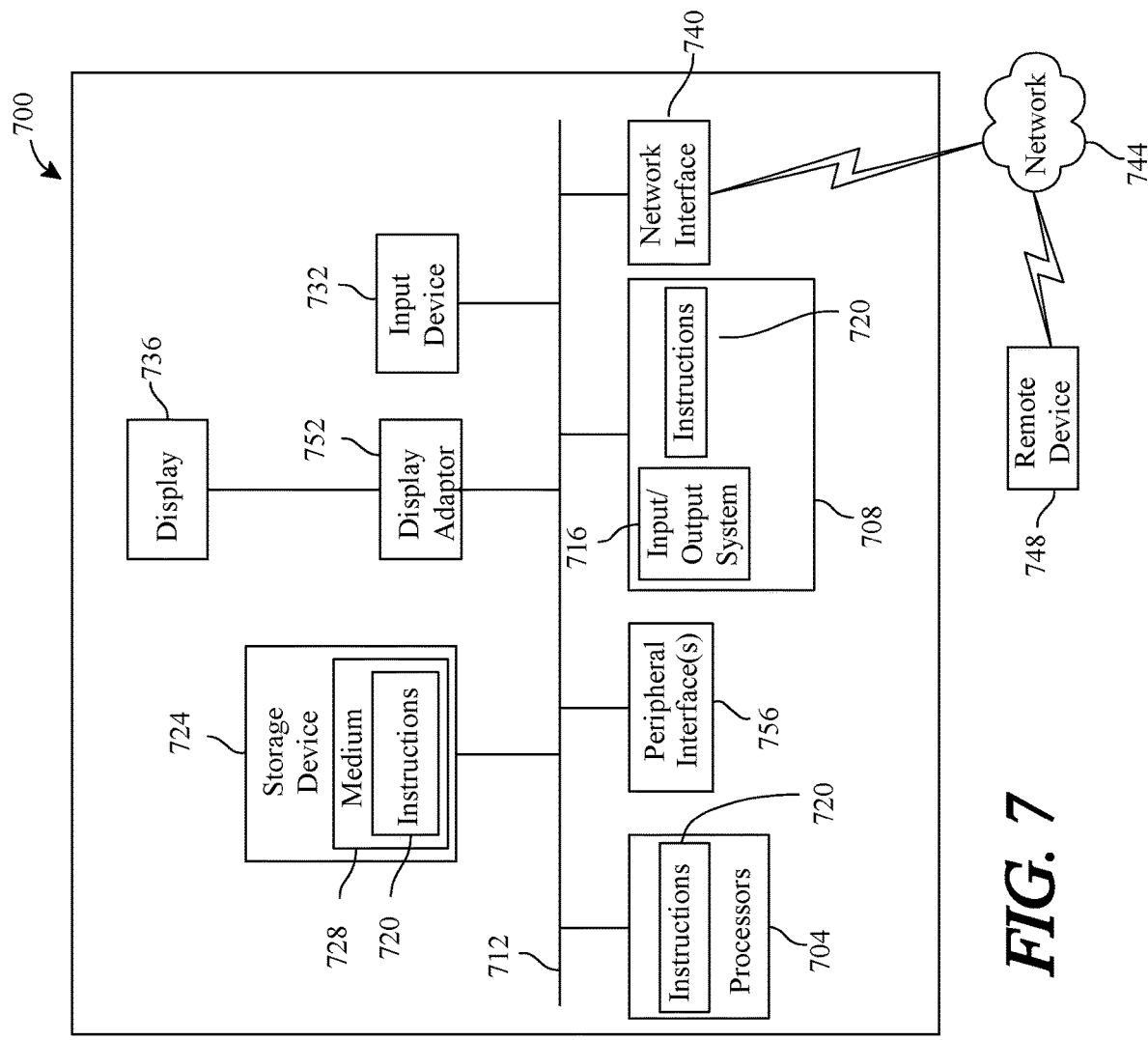
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating queries and transcribing video resumes, the apparatus comprising:
   at least a processor; and
   a memory communicatively connected to the processor, the memory containing instructions configuring the at least a processor to:
   receive, from a posting generator, a plurality of posting inputs from a plurality of postings;
   receive a video resume from a user;
   generate a plurality of queries as a function of the video resume based on a plurality of posting categories;
   transcribe, as a function of the plurality of queries, a plurality of user inputs from the video resume, wherein the plurality of user inputs is related to attributes of a user; and
   classify the plurality of user inputs to the plurality of posting inputs to match the user to the plurality of postings; and
   generate a similarity score of the matches of the user to the plurality of postings through dynamic time warping.

2. The apparatus of claim 1, wherein the memory contains instructions further configuring the processor to compress the video resume to optimize transmission.

3. The apparatus of claim 1, wherein transcribing the plurality of user inputs comprises using automatic speech recognition.

4. The apparatus of claim 1, wherein transcribing the plurality of user inputs comprises using optical character recognition.

5. The apparatus of claim 1, wherein classifying the plurality of user inputs comprises using a classification algorithm configured to output matches between the user and the plurality of postings.

6. The apparatus of claim 5, wherein classifying the plurality of user inputs further comprises training the classification algorithm using algorithm training data including a posting database and a video resume database.

7. The apparatus of claim 6, wherein the memory contains instructions further configuring the processor to rank the matches between the user and the plurality of postings of the classification algorithm.

8. The apparatus of claim 7, wherein the similarity score is calculated using a fuzzy inference system.

9. The apparatus of claim 7, wherein ranking the matches between the user and the plurality of postings of the classification algorithm is comprises using linear regression techniques.

10. A method for generating queries and transcribing video resumes, the method comprising:
   receiving, using a computing device, from a posting generator, a plurality of posting inputs from a plurality of postings;
   receiving, using a computing device, a video resume from a user;
   generating, using a computing device, a plurality of queries as a function of the received video resume to a plurality of posting categories;
   transcribing, using a computing device, as a function of the plurality of queries, a plurality of user inputs from the video resume, wherein user inputs is related to attributes of a user; and
   classifying, using a computing device, the transcribed plurality of user inputs to the plurality of posting inputs to match a user to the plurality of postings; and
   generating a similarity score of the matches of the user to the plurality of postings through dynamic time warping.

11. The method of claim 10, wherein the computing device is configured further to compress the video resume to optimize transmission.

12. The method of claim 10, wherein transcribing the plurality of user inputs comprises using automatic speech recognition.

13. The method of claim 10, wherein transcribing the plurality of user inputs comprises using optical character recognition.

14. The method of claim 10, wherein classifying the transcribed plurality of user inputs comprises using a classification algorithm configured to output matches between the user and the plurality of postings.

15. The method of claim 14, wherein classifying the transcribed plurality of user inputs further comprises training the classification algorithm using algorithm training data including a posting database and a video resume database.

16. The method of claim 15, wherein the computing device is configured further to rank the matches between the user and the plurality of postings of the classification algorithm.

17. The method of claim 16, wherein the similarity score is calculated using a fuzzy inference system.

18. The method of claim 16, wherein ranking output data of the classification algorithm is comprises using linear regression techniques.

* * * * *